United States Patent
Sandell et al.

(10) Patent No.: US 7,668,252 B2
(45) Date of Patent: Feb. 23, 2010

(54) FREQUENCY OFFSET TRACKING

(75) Inventors: Magnus Stig Torsten Sandell, Bristol (GB); Darren Phillip McNamara, Bristol (GB); Steve Carl Jamieson Parker, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 635 days.

(21) Appl. No.: 11/261,513

(22) Filed: Oct. 31, 2005

(65) Prior Publication Data

US 2006/0209979 A1   Sep. 21, 2006

(30) Foreign Application Priority Data

Jan. 7, 2005   (GB) ................. 0500281.1

(51) Int. Cl.
  *H04B 7/02*   (2006.01)
(52) U.S. Cl. .................................... 375/267
(58) Field of Classification Search ............... 375/267, 375/299, 347, 349; 700/53; 455/101, 132–141
  See application file for complete search history.

(56) References Cited

U.S. PATENT DOCUMENTS

| 7,058,002 B1 * | 6/2006 | Kumagai et al. ............ 370/203 |
| 2002/0065047 A1 * | 5/2002 | Moose ........................ 455/63 |
| 2004/0001563 A1 | 1/2004 | Scarpa |
| 2004/0190637 A1 | 9/2004 | Maltsev et al. |

FOREIGN PATENT DOCUMENTS

EP   1 363 435 A2   11/2003

OTHER PUBLICATIONS

Jianhua Liu, et al., "A Mimo System with Backward Compatibility for OFDM Based WLANS", 4TH IEEE Workshop on Signal Processing Advances in Wireless Communications, 2003, pp. 130-134.

(Continued)

*Primary Examiner*—Sam K Ahn
(74) *Attorney, Agent, or Firm*—Oblon, Spivak, McClelland, Maier & Neustadt, L.L.P.

(57) ABSTRACT

The present invention relates to estimating and correcting for frequency offset errors in wireless receivers, and is particularly but not exclusively related to MIMO WLAN applications. The present invention provides an improved method of tracking receiver frequency offsets in a receiver for MIMO systems. These receiver based frequency offset components are caused by errors or inaccuracies in various receiver sub-systems such as phase lock loops or carrier frequency oscillator error, and sampling clock rate errors. The frequency offsets due to each of a number of receiver sub-systems are estimated by monitoring frequency offsets on a number of channels or subcarriers (such as OFDM pilot channels) on different frequencies. These channel frequency offsets are preferably estimated by detecting the phase rotation between adjacent pilot symbols on each respective channel. They are then weighted according to a quality parameter of the estimates, which corresponds to their accuracy. An example of a quality parameter is the effective SNR of the respective channels, or preferably the error variance of the phase rotation. In an embodiment the quality parameter is or is proportional to $\|Hx\|^2$. The weighted channel frequency offsets are then used to determine one or more receiver sub-system frequency offset components. For example a least squares line fit analysis can be performed.

16 Claims, 8 Drawing Sheets

Fig 9

OTHER PUBLICATIONS

V. S. Abhayawardhana, et al., "Residual Frequency Offset Correction for Coherently Modulated OFDM Systems in Wireless Communication", VTC, 2002, pp. 777-781.

Christian Oberli, et al., "Maximum Likelihood Tracking Algorithms for MIMO-OFDM", IEEE Communications Society, 2004, pp. 2468-2472.

* cited by examiner

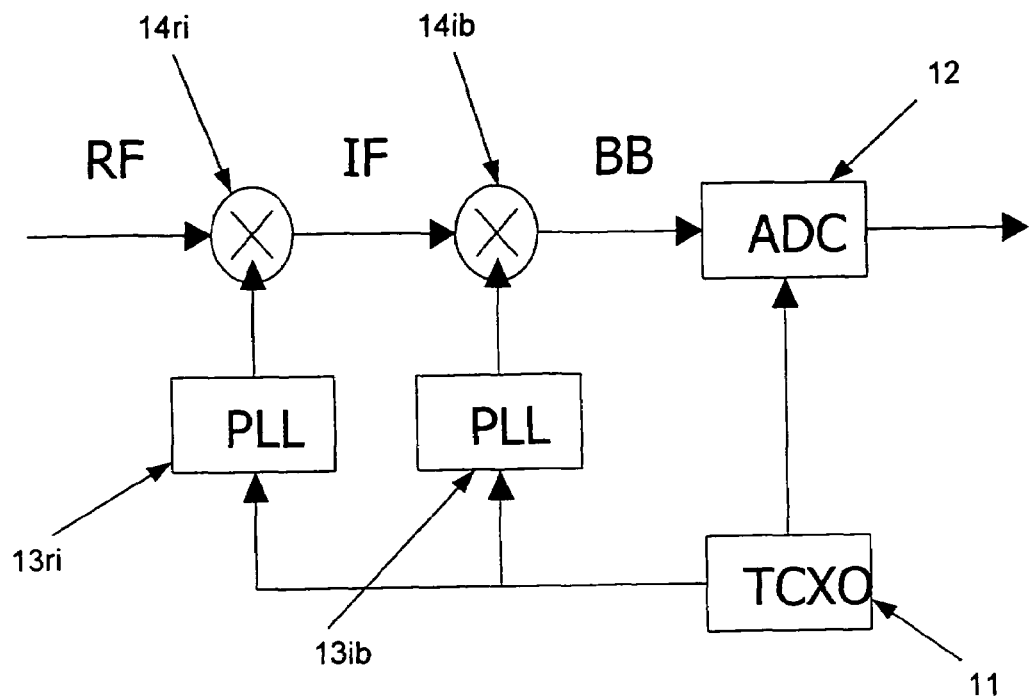
Fig 2
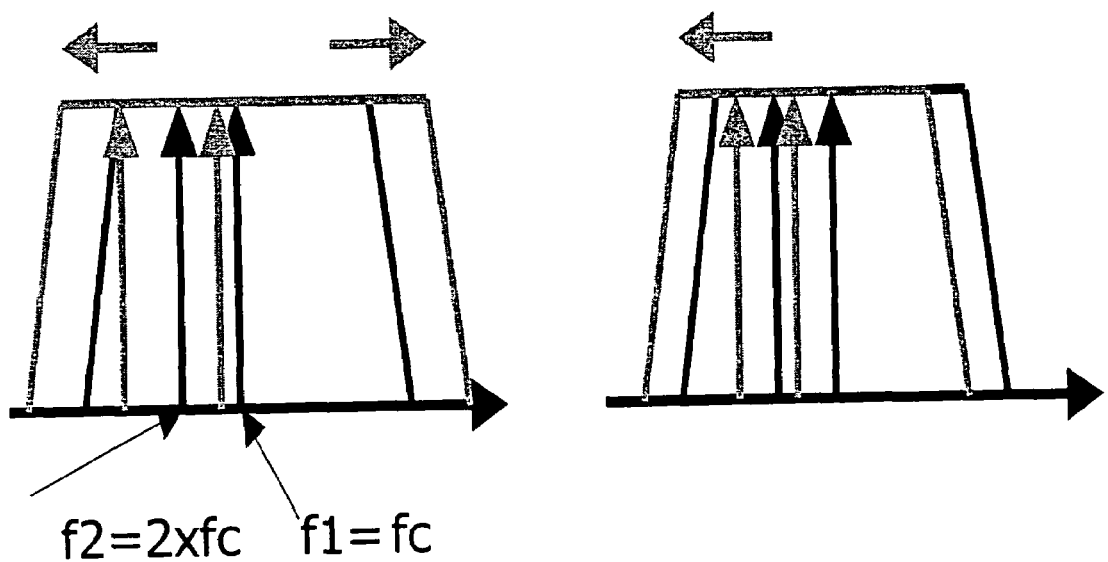
Fig 3a
Fig 3b

FREQUENCY OFFSET TRACKING

FIELD OF THE INVENTION

The present invention relates to estimating and correcting for frequency offset errors in wireless receivers, and is particularly but not exclusively related to MIMO WLAN applications.

BACKGROUND OF THE INVENTION

In wireless communication systems, small differences between frequency of a transmitted signal's carrier frequency and the receiver's locally generated carrier frequency will effect the accuracy of the received signal, and should therefore be corrected. These frequency offsets are typically caused by inaccuracies in the receiver's phase lock loop tracking the received signal's carrier frequency, as well as temperature variations in local oscillators. If these frequency offsets are not corrected, phase errors in the estimation of data symbols will occur, which degrades performance.

An increasingly important wireless technology is orthogonal frequency division multiplexing (OFDM) which is robust in noisy and rapidly changing environments, such as those in which WLAN's are employed. OFDM systems transmit on a number of sub-carriers (having different carrier frequencies) simultaneously, such that a series of symbols are sent over different sub-carriers in the form of a packet.

In OFDM systems, the packet preamble allows coarse and fine carrier frequency offset estimates to be made in order to adjust the receiver oscillator signals and phase lock loop tracking to correctly receive a signal from a transmitter having a slightly different carrier frequency. This is described for example in Liu, Li, Stoica, "A MIMO system with backwards compatibility for OFDM based WLANs", SPAWC 2003, 15-18 Jun. 2003, pages 130-134.

Once this initial estimate is known, tracking of the frequency offset can also be carried out over the duration of the packet in order to account for changes in channel conditions and other effects which can influence the received carrier frequency. Pilot symbols, ie symbols known to the receiver, are inserted among the data symbols of the packet to facilitate tracking of the carrier frequency. Various ways of achieving this are known.

For example in IEEE802.11a, an OFDM based WLAN standard, 4 subcarriers are allocated for dedicated pilot symbols, which are used for tracking frequency offsets. Between two consecutive OFDM symbols, a frequency offset will manifest itself as a phase rotation on each subcarrier. By measuring this phase difference for each pilot subcarrier, the frequency offset can be estimated (since the channel is assumed to be constant and the transmitted symbols are known, any phase change is due to a frequency offset).

The frequency offset on each subcarrier is typically caused by a combination of an error in the receiver generated carrier frequency which is used for tracking the received signal in a phase lock loop (PLL), and an error in the sampling clock. The former will cause a constant frequency shift on all subcarriers, while the latter will be proportionally worse towards the band edges. In IEEE802.11a, the 4 pilots are used on subcarriers $-21$, $-7$, $+7$, and $+21$ (out of 64 subcarriers spanning 20 MHz, the subcarriers are numbered $-32$ to $+31$). Once the frequency shift on each subcarrier has been estimated, the following system of equations is obtained:

$$\Delta f_{-21} = -21\alpha + \beta$$
$$\Delta f_{-7} = -7\alpha + \beta$$
$$\Delta f_7 = 7\alpha + \beta$$
$$\Delta f_{21} = 21\alpha + \beta$$

where $\alpha$ is the sampling clock offset and $\beta$ is the carrier generated carrier frequency offset.

As is known, a least squares line fit can be performed to obtain a best estimate for the two offsets, and this leads to the following estimates for the two offset components:

$$\hat{\alpha} = \frac{-3\Delta f_{-21} - \Delta f_{-7} + \Delta f_7 + 3\Delta f_{21}}{140}$$

$$\hat{\beta} = \frac{\Delta f_{-21} - \Delta f_{-7} + \Delta f_7 + \Delta f_{21}}{4}$$

Another method of achieving frequency offset estimates is described in V. S. Abhayawardhana, I. J. Wassell, "Residual frequency offset correction for coherently modulated OFDM systems in wireless communication", Vehicular Technology Conference, 6-9 May 2002, vol 2, Pages 777-781. This describes tracking of frequency offsets by using decision feedback. An estimate of the channel response H is made for each sub-carrier based on a decoded training symbol from each respective sub-carrier. A subset of these subcarriers is then selected which has a channel response above a certain threshold. A maximum likelihood estimate of the residual frequency estimate is then obtained using only these subcarriers.

Multiple Input Multiple Output (MIMO) arrangements are being increasingly investigated as a way of increasing the data rate of existing wireless systems. For example the developing WLAN standard IEEE802.11n is expected to use MIMO technology. MIMO involves using multiple antennas at the transmitter which simultaneously transmit different symbols, which in turn are received at a receiver with multiple receiver antennas. Special processing in the transmitter and receiver is required in order for the receiver to be able to recover the transmitted symbols using the various combinations of received symbols from its different receiving antennas.

MIMO systems are inherently multi-path signal propagation systems which adds a further layer of complexity to the task of estimating the frequency offset between the transmitter and receiver. An example of frequency offset tracking estimation in a MIMO system is described in Oberli, Daneshrad, "Maximum Likelihood Tracking Algorithms for MIMO-OFDM", IEEE Communications Society 2004, vol 4, p 2468-2472, June 2004. However this arrangement is complex and requires knowledge of the channel and therefore makes it susceptible to channel estimation errors.

Therefore there is a need for an improved frequency offset tracking method and apparatus especially for MIMO systems.

SUMMARY OF THE INVENTION

In general terms the present invention provides an improved method of tracking receiver frequency offsets in a receiver for MIMO systems. These receiver based frequency offset components are caused by errors or inaccuracies in various receiver sub-systems such as phase lock loops or carrier frequency oscillator error, and sampling clock rate errors. The frequency offsets due to each of a number of receiver sub-systems are estimated by monitoring frequency offsets on a number of channels or subcarriers (such as OFDM pilot channels) on different frequencies. These channel frequency offsets are preferably estimated by detecting the phase rotation between adjacent pilot symbols on each respective channel. They are then weighted according to a quality parameter of the estimates, which corresponds to their accuracy. An example of a quality parameter is the effective SNR of the respective channels, or preferably the error variance of the phase rotation. In an embodiment the quality parameter is or is proportional to $\|Hx\|^2$. The weighted channel frequency offsets are then used to determine one or more receiver sub-system frequency offset components. For example a least squares line fit analysis can be performed. By weighting the channels, the accuracy of the receiver or receiver sub-system frequency offset estimates can be improved. This allows these offsets to be corrected for by the receiver which improves recovery of transmitted data. This is especially useful for OFDM based systems which are particularly susceptible to frequency offsets.

In an embodiment the frequency offsets are determined by measuring the phase rotations on each pilot channel of an OFDM MIMO system. The quality parameter for each channel is obtained by determining the error variance of the corresponding phase rotations. By making certain assumptions and approximations, it has been possible to determine the error variances in a MIMO receiver. These provide a practical way in which to determine the accuracy or quality of the phase rotation in a MIMO receiver. Whilst simple SNR or some other parameter related to the channel power is adequate for a SISO receiver, it is a poor measure of reliability or quality in a MIMO receiver. These phase rotation estimates for each channel are then weighted according to their accuracy or quality (ie their error variance) before being combined in a calculation (eg least squares line fit) to determine the frequency offset estimate for the receiver itself. By weighting the various frequency offsets apparent from each pilot sub-carrier, its contribution to the overall receiver frequency offset can be modified depending on how accurate each sub-carrier or channel frequency offset estimation appears. Thus a more accurate frequency offset estimation is achieved in a MIMO system whilst still using a relatively simple implementation.

In particular in one aspect there is provided a method of estimating frequency offset for a MIMO receiver according to claim 1.

Various methods can be used to determine the frequency offset component from each channel. Preferred methods include differential phase estimation, or coherent phase estimation. Whilst the later is more accurate, the former is more robust against channel estimation inaccuracies.

The phase rotations may be determined between adjacent or various symbols on the pilot sub-carriers. Alternatively pilot symbols in non-dedicated pilot channels may be used, for example in a regular training sequence.

For differential phase rotation estimation, it can be shown that the error variance is $\sigma_v^2/\|Hx\|^2$, where $\sigma^2$ is the channel noise variance. Thus the quality parameter used for weighting each channel frequency offset contribution can be proportional to $\|H_k x_k\|^2$, where k is the channel.

Whilst in an embodiment the calculation comprises calculating the least squares line fit of the carrier frequency shifts weighted by their respective quality parameters, other calculations could alternatively be used.

The receiver frequency offset can be determined overall, or attributed to separate sub-components of the receiver. The embodiments provide methods of determining the contribution from the sampling clock for the analogue to digital converters and from the down-converting phase lock loops.

In particular in another aspect there is provided apparatus for estimating frequency offset for a MIMO receiver according to claim 12.

There is also provided computer programs for implementing the defined methods.

BRIEF DESCRIPTION OF THE INVENTION

Embodiments will now be described with reference to the following drawings, by way of example only and without intending to be limiting, in which:

FIG. 2 illustrates part of an OFDM receiver in more detail;

FIGS. 3a and 3b show the effects of frequency offset on OFDM pilot sub-carriers from the PLL and the clock of a receiver respectively;

DETAILED DESCRIPTION

Figure 1:
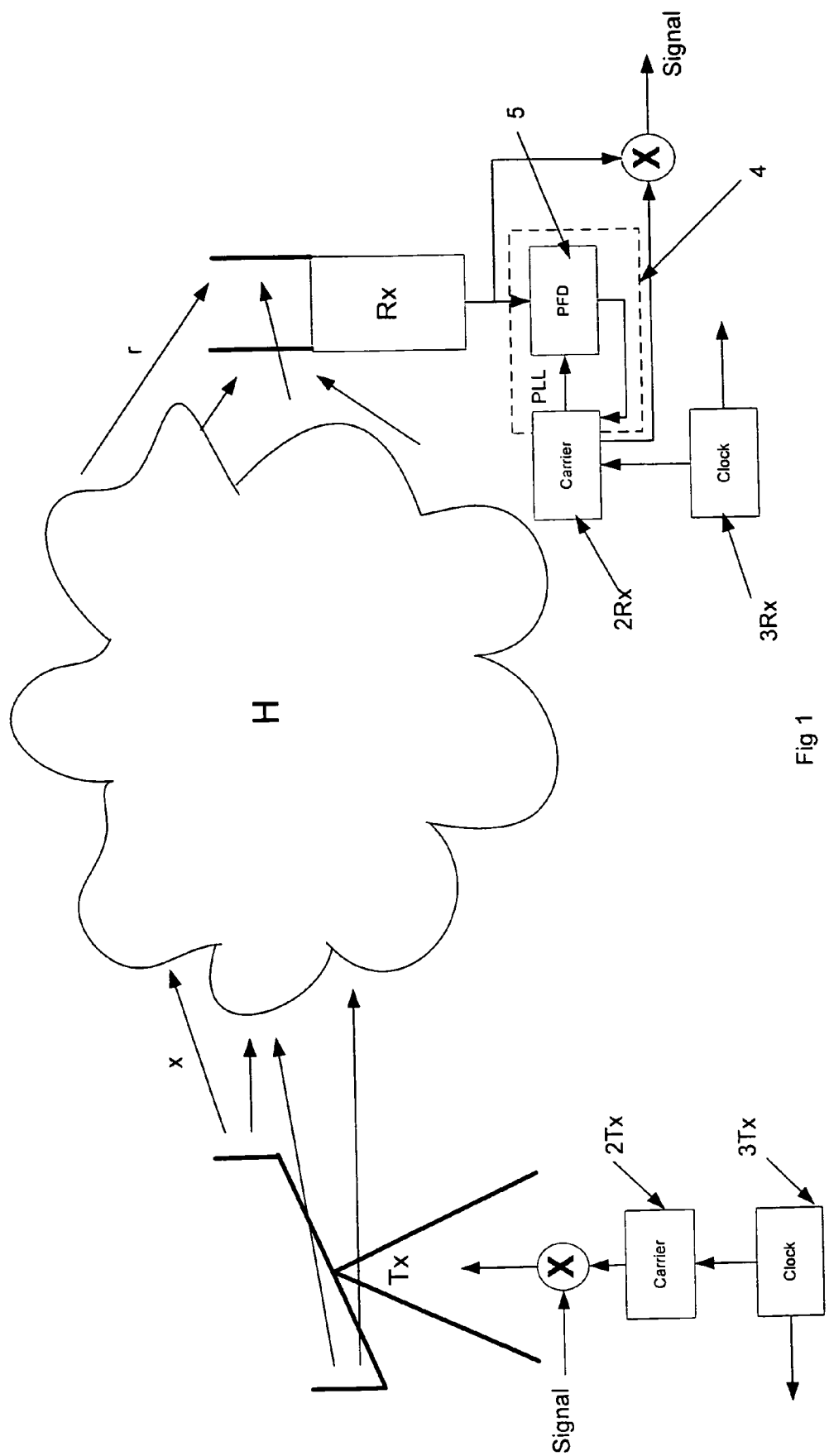
FIG. 1 illustrates a MIMO wireless communications system.

FIG. 1 shows a wireless communications system having a transmitter Tx, a receiver Rx and an air interface channel H. At the transmitter an information signal or data is multiplied by a carrier frequency as is known, in order to produce symbols which are then transmitted. The carrier signal is generated by a local oscillator $2_{Tx}$, and the transmitter also comprises a local system clock $3_{Tx}$ for use in other signal processing. The transmitted symbols x travel through the air interface channel H and are received by the receiver Rx as symbols r which have been modified by the effects of the channel H and noise. The received symbols r are then multiplied by the carrier frequency again in order to recover the original data signal.

The carrier signal is generated by a local oscillator $2_{Rx}$, and the receiver also comprises a local system clock $3_{Rx}$ for use in other signal processing. Phase differences or lack of synchronicity between the transmitter and receiver can largely be resolved with the use of a phase locked loop PLL 4 which adjusts the locally generated carrier frequency ($2_{Rx}$) at the receiver Rx to match the incoming frequency ($2_{Tx}$) of the received symbols. However frequency offsets between the carrier signals generated by the transmitter ($2_{Tx}$) and receiver ($2_{Rx}$) also degrade signal recovery and therefore various mechanisms are used to correct for these. Similarly frequency offsets between the respective local clocks $3_{Tx}$ and $3_{Rx}$ of the transmitter Tx and receiver Rx also affect the recovery processing of the symbols at the receiver, and therefore may also require attention.

FIG. 2 illustrates part of an OFDM receiver for a single sub-carrier. The receiver comprises parallel receiving chains for each sub-carrier in the OFDM signal, and these each comprise a local clock 11, an analogue to digital converter 12, and typically two phase lock loops 13ri and 13ib with respective multipliers 14ri and 14ib for down-converting the incoming signal from radio to intermediate frequency and from intermediate to baseband frequency respectively. The baseband signal is digitised by the ADC 12 for further digital processing. It can be seen that the local clock 11 provides inputs to the ADC 12 for its sampling frequency, and to the PLL's 13 for their oscillators.

There are two main causes of frequency offsets in an OFDM system. The first is a mismatch in the carrier frequency between the transmitter and receiver. When the receiver down-converts the radio frequency (RF) signal to baseband, an error will occur if the carrier frequency is not correct. This error will shift the whole baseband signal in frequency and manifest itself as a frequency error, constant across all subcarriers. The other error is when the frequency of the sampling clock 11 is not correct. In this case, there will be a frequency error that gets progressively worse across the subcarriers. These effects are illustrated in FIGS. 3a and 3b, which show respectively the effect of a sampling rate frequency offset error ($\alpha$) and a "PLL" error or frequency offset ($\beta$).

Figure 4:
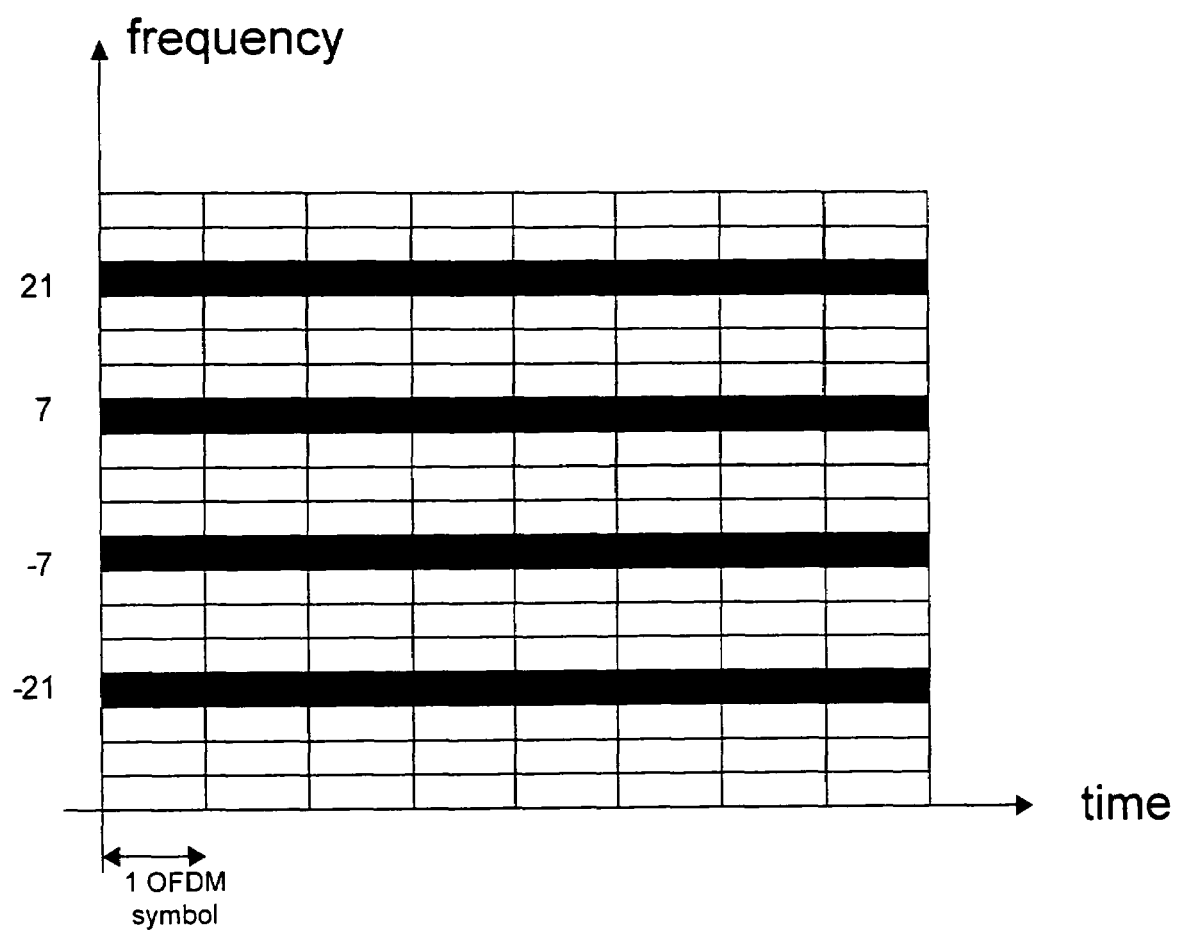
FIG. 4 illustrates pilot sub-carriers in an OFDM signal.

In order to correct for these effects, pilot symbols are employed to allow tracking of the frequency errors, and hence to enable correction for them. Normally several subcarriers are dedicated to known symbols, which are used for frequency offset tracking. An example OFDM signal from the IEEE802.11a system is illustrated in FIG. 4. These pilots (ie known symbols on known sub-carriers) are only used for tracking, and a coarser estimation is assumed to have taken place already.

Figure 5:
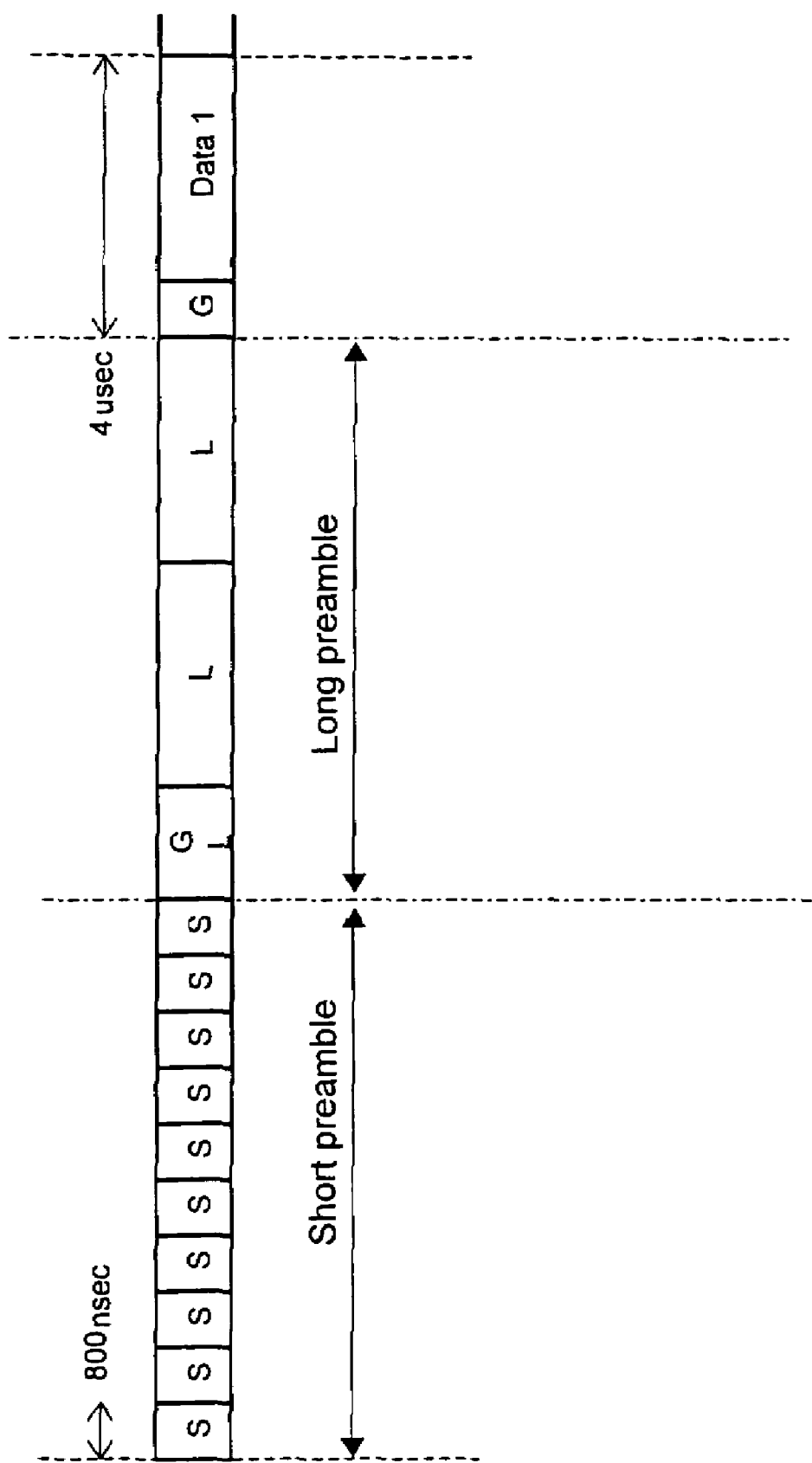
FIG. 5 illustrates the preamble of an OFDM signal.

FIG. 5 illustrates another representation of an OFDM signal or packet from IEEE802.11a. At the start of each packet there is a short and a long preamble. A coarse frequency offset estimate is obtained by using the short preamble, which is also used for frame edge detection, time synchronisation and automatic gain control. A fine tuning of the initial frequency offset estimate is then obtained by using the long preamble, which is also used for channel estimation.

In the data part of the packet, known pilot symbols are inserted on dedicated sub-carriers (marked with black in FIG. 4). These symbols are used to track any changes in the frequency offset and to further refine the estimate. These pilot symbols are denoted by $x_k$ hereinafter. By noting the phase difference between two consecutive received signals or symbols ($X_k$ and $X_{k+1}$ for example) on the same subcarrier, a frequency offset can be detected as is known. In the noiseless case with no frequency offset, this phase difference should be zero.

As discussed above, the frequency offset on each subcarrier is caused by a combination of an error in the locally generated carrier frequency ($\beta$) and an error in the sampling clock ($\alpha$). The former will cause a constant frequency shift on all subcarriers, while the latter will be proportionally worse towards the band edges. In IEEE802.11a, the pilot sub-carriers are on channels or sub-carriers −21, −7, +7, and +21 (out of 64 subcarriers spanning 20 MHz, the subcarriers are numbered −32 to +31). The frequency shift estimate on each subcarrier will therefore be related to the above errors as follows:

$$\Delta f_{-21} = -21\alpha + \beta$$

$$\Delta f_{-7} = -7\alpha + \beta$$

$$\Delta f_{7} = 7\alpha + \beta$$

$$\Delta f_{21} = 21\alpha + \beta$$

A least squares line fit is preferably employed to provide an estimate for the sampling clock error ($\alpha$) and the carrier frequency error ($\beta$) as follows:

$$\hat{\alpha} = \frac{-3\Delta f_{-21} - \Delta f_{-7} + \Delta f_7 + 3\Delta f_{21}}{140}$$

$$\hat{\beta} = \frac{\Delta f_{-21} + \Delta f_{-7} + \Delta f_7 + \Delta f_{21}}{4}$$

However the least squares line fit or mean squared error (MSE) implicitly assumes that all observations, i.e. the estimated frequency shift on each subcarrier, have equal importance. But in a frequency selective channel, some subcarriers can be attenuated by fading and should consequently not contribute as much to the estimate.

The embodiments provide a method of weighting the frequency offset estimates (eg phase rotations between adjacent received symbols) for each measured channel (eg pilot subcarrier) according to a quality parameter of that channel; which corresponds to the accuracy of the channel frequency offset estimation. Thus sub-carriers that are highly attenuated due to fading for example are given less weight than those which are strongly received.

In a single input single output (SISO) system a suitable quality parameter is the signal to noise ratio (SNR) of each channel. As this is proportional to channel power, this can be easily implemented by measuring this for each channel and weighting the corresponding channel frequency offset estimation accordingly. However other suitable performance parameters could also be used, for example SNIR.

However in a MIMO system, the channel power $$\sum_{n=1}^{N} \sum_{m=1}^{M} |H_{n,m}|^2 \cdot |x|^2$$

(which SNR is dependent on) is a poor measure of reliability. This is because in MIMO, how the signals combine is more important than their respective channel powers. For example if two pilot symbols transmitted from two different antenna combine destructively, it doesn't matter how strong the individual channels are, they will provide a poor measure of reliability. To illustrate, a simple example is pilots x1=1,x2=1 and the channel h1=1,h2=−1. Then the received signal is h1*x1+h2*x2=0, but the channel power is h1*h1+h2*h2=2, which doesn't reflect the fact that the received signal is 0. Therefore an alternative method of weighting the channel frequency offset estimations is required in order to improve the receiver frequency offset in a MIMO system.

In a system with M transmitting and N receiving antennas, the input-output relation on subcarrier k at time t and time t+1 can be written as $$r_{k,t} = H_{k,t} x_k + v_{k,t}$$

$$r_{k,t+1} = e^{j\phi_k} H_{k,t} x_k + v_{k,t+1}$$

where $r_{k,t} \in C^{N \times 1}$ is the received signal, $H_{k,t} \in C^{N \times M}$ is the channel, $x_k \in C^{M \times 1}$ are the transmitted pilots and $v_{k,t} \in C^{N \times 1}$ is the noise, where C is a set or matrix of complex numbers, and where $\phi_k$ is the phase difference between $x_k$ in $r_{k,t}$ and $r_{k,t+1}$. For simplicity of explanation it is assumed here that the consecutive pilot symbols are the same ($x_k$), however as is known this need not be the case. So long as the symbols are known or expected, known appropriate modifications can be made to obtain the phase rotation due to frequency offset.

In order to estimate the frequency offset on each pilot subcarrier (so it can be compensated for later on), the phase rotations can be estimated by minimising $\|e^{j\phi}r_1-r_2\|^2$ as is known. Note that this differential estimation doesn't require the knowledge of the channel, which makes it simpler and more robust to channel estimation errors.

The cost function $\|e^{j\phi}r_1-r_2\|^2$ can be minimised by expanding the square, $\|e^{j\phi}r_1-r_2\|^2=\|e^{j\phi}r_1\|^2+\|r_2\|^2-2\text{Re}\{e^{-j\phi}r_1^H r_2\}$. It can be seen that this is minimised when $\hat{\phi}=\arg(r_1^H r_2)$, where arg( ) is the argument of a complex number. The phase estimate is now $\hat{\phi}=\arg((Hx+v_1)^H(e^{j\Phi}Hx+v_2))= \arg(x^H H^H e^{j\Phi}Hx+ x^H H^H v_2+v_1^H e^{j\Phi}Hx+v_1^H v_2)$. At medium and high SNR, the last term is very small and can be discarded, and hence $\hat{\phi}\approx\arg(e^{j\phi\|Hx\|^2}+x^H H^H v_2+v_1^H e^{j\Phi}Hx)$. The noise term $e=x^H H^H v_2+v_1^H e^{j\Phi}Hx$ has the variance $\sigma_e^2=E\{|e|^2\}=2\sigma_v^2\|Hx\|^2$, where channel noise variance is $\sigma_v^2=E\{|v_{n,k}|^2\}$, where E{ } is the expectation of a random variable. The arg( ) function is non-linear but by making some approximations, we can find the error in the phase estimate. The arg( ) function $$\arg(x) = \text{atan}\left(\frac{\text{Im}\{x\}}{\text{Re}\{x\}}\right)$$

can be approximated by truncating the Taylor series expansion of the a tan( ) function, $$f(x, y) = \text{atan}\left(\frac{y}{x}\right)$$
$$= \text{atan}\left(\frac{y_0 + \Delta y}{x_0 + \Delta x}\right) \approx \text{atan}\left(\frac{y_0}{x_0}\right) + x\frac{\partial f}{\partial x}\bigg|_{x=x_0} + y\frac{\partial f}{\partial y}\bigg|_{y=y_0}$$
$$= \text{atan}\left(\frac{y_0}{x_0}\right) + \frac{x_0\Delta y - y_0\Delta x}{x_0^2 + y_0^2}$$

Hence the phase estimate $$\hat{\phi} = \arg(e^{j\phi}\|Hx\|^2 + e)$$
$$= \text{atan}\left(\frac{\sin\phi\|Hx\|^2 + \text{Im}\{e\}}{\cos\phi\|Hx\|^2 + \text{Re}\{e\}}\right)$$

can be approximated as $$\hat{\phi} \approx \text{atan}\left(\frac{\sin\phi\|Hx\|^2}{\cos\phi\|Hx\|^2}\right) + \frac{\cos\phi\|Hx\|^2\text{Im}\{e\} - \sin\phi\|Hx\|^2\text{Re}\{e\}}{\cos\phi\|Hx\|^4 - \sin^2\phi\|Hx\|^4}$$
$$= \phi + \frac{\cos\phi\text{Im}\{e\} - \sin\phi\text{Re}\{e\}}{\|Hx\|^2}$$

The mean-squared error (MSE) of the phase offset estimate is now $$MSE = E\{|\hat{\phi} - \phi|^2\} = \frac{\cos^2\phi\frac{\sigma_e^2}{2} + \sin^2\phi\frac{\sigma_e^2}{2}}{\|Hx\|^4} = \frac{\sigma_v^2}{\|Hx\|^2}.$$

Thus, this phase difference or rotation estimate is (roughly) a Gaussian distributed variable with mean phase difference $\phi$ and error variance $\sigma_v^2/\|Hx\|^2$. In other words, the error variance of a particular channel phase rotation estimate is approximately the channel noise variance divided by the squared normalised value of the product of the channel matrix and the pilot matrix. The variance is a measure of how reliable the estimate ($\phi$) is, and can thus be used as a quality parameter for weighting each pilot channel frequency estimate. Due to the channel noise, the phase estimate on each pilot subcarrier is a random value. It has the same mean as the actual phase but its variance is determined by $\sigma_v^2/\|Hx\|^2$. Since this variance can be determined, it can be used to produce better estimates of the receiver frequency offset by weighting the individual channel phase or frequency estimates according to their variances.

Thus when combined, the individual channel offset estimates are weighted by their strength or accuracy (according to their variance). An estimate with a small error variance is more reliable than one with a large variance. The reason they have different error variances is that in a frequency-selective channel, the pilot subcarriers have different channels. Hence the error variances $\sigma_v^2/\|Hx\|^2$ will be different. By assigning a large weight to an accurate estimate (small variance), they can be efficiently combined to produce a better estimate for the overall receiver frequency offset. By defining the "effective SNR" on a pilot subcarrier as $SNR_{eq}=\|Hx\|^2/\sigma_v^2$, these SNRs are a natural choice as weights since they are large when the variance is small.

In other words, the quality parameter or effective SNR on each pilot subcarrier is proportional to $\|Hx\|^2$ and can thus be used as weights. Note that this is different from just summing the powers from all MN subchannels, $$\sum_{n=1}^{N}\sum_{m=1}^{M}|H_{n,m}|^2.$$

Also note that in the single antenna case, $\|Hx\|^2=|H|^2|x|^2$, ie proportional to the channel power.

Once the estimate on pilot subcarrier k is obtained, the final estimate is computed as the weighted mean, where the k:th weight is $\|H_k x_k\|^2$.

For ease of the following explanation, effective "SNR" or the error variance quality parameter is referred to as simply SNReq, and in an embodiment equals $\|Hx\|^2$.

To maximise the benefits of a least squares fit, the SNReq of each subcarrier is preferably used as this allows individual estimates to be weighted. One way is to minimise the error $$\sum_k SNReq_k(\Delta f_k - \alpha k - \beta)^2,$$

where SN Req$_k$ is the SNReq and $\Delta f_k$ the frequency shift on subcarrier k., $\alpha$ is the sampling clock error and $\beta$ is the carrier frequency error. This fits a line through the estimated phase offsets on each subcarrier (because the phase offsets depend linearly on the subcarrier index). This technique is called weighted linear regression and the optimum solution is:

$$\hat{\alpha} = \frac{\sum_k SNReq_k \sum_k SNReq_k \Delta f_k k - \sum_k SNReq_k \Delta f_k k \sum_k SNReq_k k}{\sum_k SNReq_k \sum_k SNReq_k k^2 - \left(\sum_k SNReq_k k\right)^2}$$

$$\hat{\beta} = \frac{\sum_k SNReq_k \Delta f_k k - \hat{\alpha} \sum_k SNReq_k k}{\sum_k SNReq_k}$$

Figure 6:
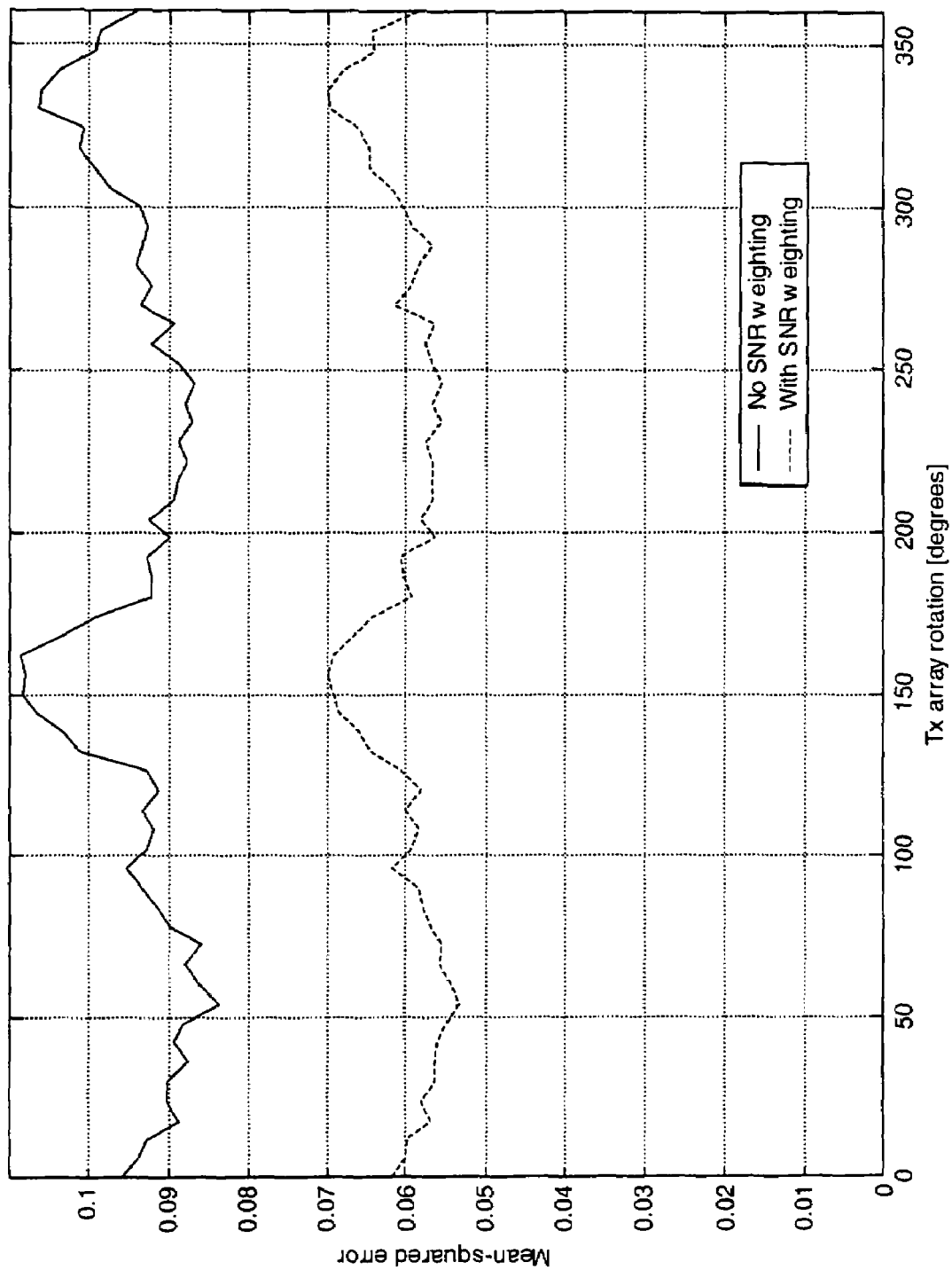
FIG. 6 illustrates mean squared error of the carrier frequency error.
Figure 7:
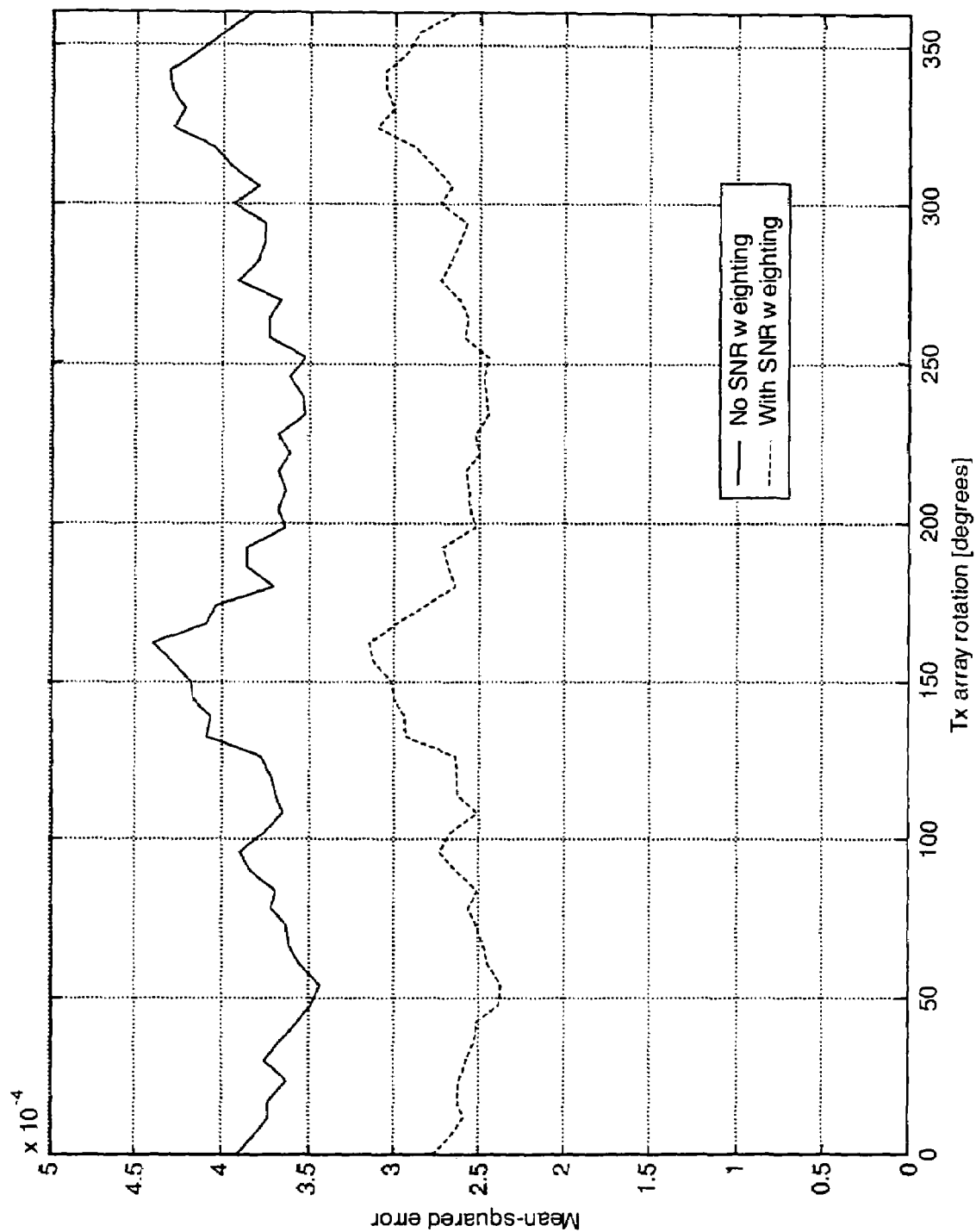
FIG. 7 illustrates mean squared error of the sampling clock error.

Performance improvements using this SNReq weighting in a multiple antenna system can be seen in FIGS. 6 and 7. The system tested used two transmnit and two receive antennas and the transmitted pilots were $x_{k,m}=1/\sqrt{2}$ with k=−21,−7,7, 21 denoting the pilot subcarriers and m=1,2 denoting the transmit antennas. The simulations were done using the IEEE802.11 n channel model F with a varying transmit array orientation and the SNReq was 5 dB. The mean-squared error (MSE) of the carrier frequency error and sampling clock error are shown in FIG. 5 and 6, respectively. As can be seen, there is a substantial gain by using the SNReq weight algorithm of this embodiment.

This embodiment describes the estimation of carrier frequency offset and/or sampling clock offset by using weighted linear regression. By using the SNReq on the different pilot subcarriers as weights, an improved line fitting can be performed and hence, a reduction in the offset error is achieved.

Note that several other techniques for doing curve fitting exist, all of which can be enhanced by using this SNReq (or some other) quality parameter weighting.

In an alternative embodiment, a reduced complexity technique ignores the sampling clock offset α (which in many systems can be rather small) and only estimates the carrier frequency offset. By setting α=0, we get $$\hat{\beta} = \frac{\sum_k SNReq_k \Delta f_k}{\sum_k SNReq_k}.$$

As an example, consider SNReq1=1 and SNReq2=2. Then:

$$\hat{\beta} = \frac{\Delta f_1 + 2\Delta f_2}{1+2} = \frac{1}{3}\Delta f_1 + \frac{2}{3}\Delta f_2.$$

As can be seen, the estimate on pilot subcarrier 2 gets a larger weight due to its higher "SNR" (SNReq) or lower variance.

By weighting pilot subcarriers with their respective SNReq's, a better frequency offset estimator can be constructed which is more robust against frequency selective fading and, in the case of multiple antennas, beamforming nulls. Correction for these frequency offsets can then be made as is known. Typically a receiver would compensate the data symbols by adjusting the phase corresponding to the frequency offset. It is also possible to feed the estimated frequency offsets back to the oscillators via a PLL, so that the carrier frequency and sample clock offsets are reduced.

Further embodiments may use alternative methods of determining the frequency offset for each pilot channel. Similarly alternative performance parameters (to SNReq) can be used. Also alternative estimation techniques can be used to obtain the carrier frequency and/or sampling offsets.

These methods are particularly suited to OFDM systems with multiple transmit/receive antennas, and in particular WLAN systems. However other systems can also benefit from this, by simply amending the calculation for phase rotation variance as would be known to those skilled in the art.

Figure 8:
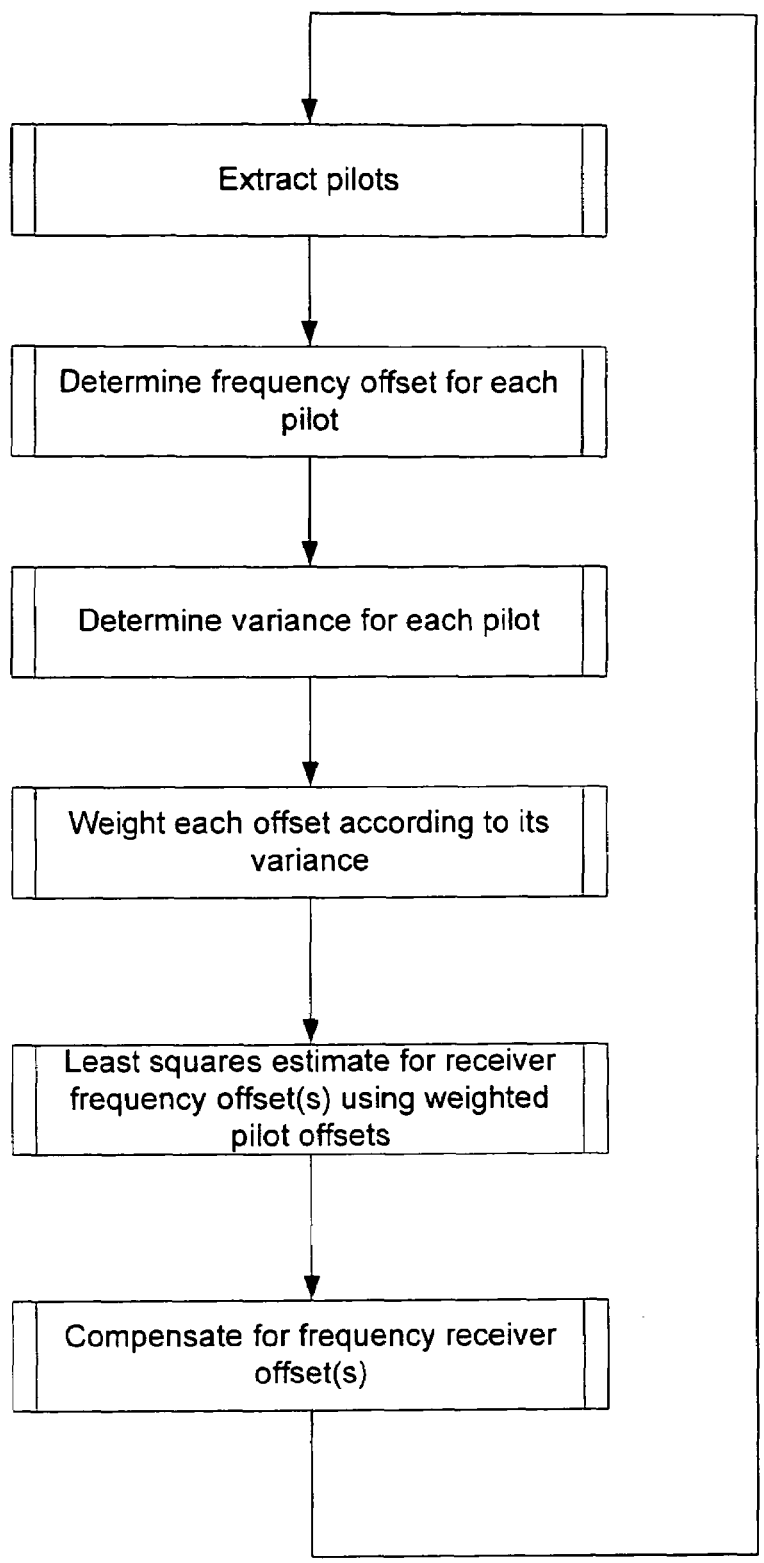
FIG. 8 illustrates a flow diagram of an embodiment.

Referring now to FIG. 8, a method of operating a receiver according to an embodiment is illustrated. The method can be implemented in a MIMO-environment, especially for an OFDM based WLAN. Pilot symbols are extracted in order to facilitate frequency offset tracking. The pilot symbols may be inserted within a data stream at known time slots for example, or may be provided by dedicated channels such as sub-carriers in an OFDM system.

The phase difference or rotation φ between adjacent pilot symbols is determined as is well known. This provides a frequency shift or offset estimate Δf for the corresponding channel. As described above, a quality parameter is determined for each channel frequency offset estimate Δf. In the preferred embodiment this is the error variance $\sigma_v^2/\|Hx\|^2$ of each estimate Δf. A low error variance is an indication of a high quality or accuracy estimate, whereas a high variance is an indication of a lower accuracy or quality estimate. Therefore each estimate can be weighted according to its quality, and in one implementation multiplied by the inverse of the error variance, ie the quality parameter or effective SNR, $SNR_{eq}=\|Hx\|^2/\sigma_v^2$. In a further alternative each estimate may simply be weighted according to its $\|HX\|^2$, or equivalent signal strength, where the k:th weight is $\|H_k x_k\|^2$.

Once the channel frequency shift estimates are weighted (eg $\phi_k \cdot \|H_k x_k^2\|$), then using multiple channel estimates (the 4 dedicated pilot channels in the IEEE802.11a specification for example) a mean squared error calculation (or other method) can be performed to obtain a frequency offset estimate for the receiver (either the phase lock loop carrier component only, or together with the sampling error) as described above.

This method is performed periodically in order to perform the frequency offset tracking function, correction for this can then be implemented as described above. The IEEE802.11a protocol uses 4 symbols at a time to derive the frequency offset for each pilot channel, but any number could be used.

Figure 9:
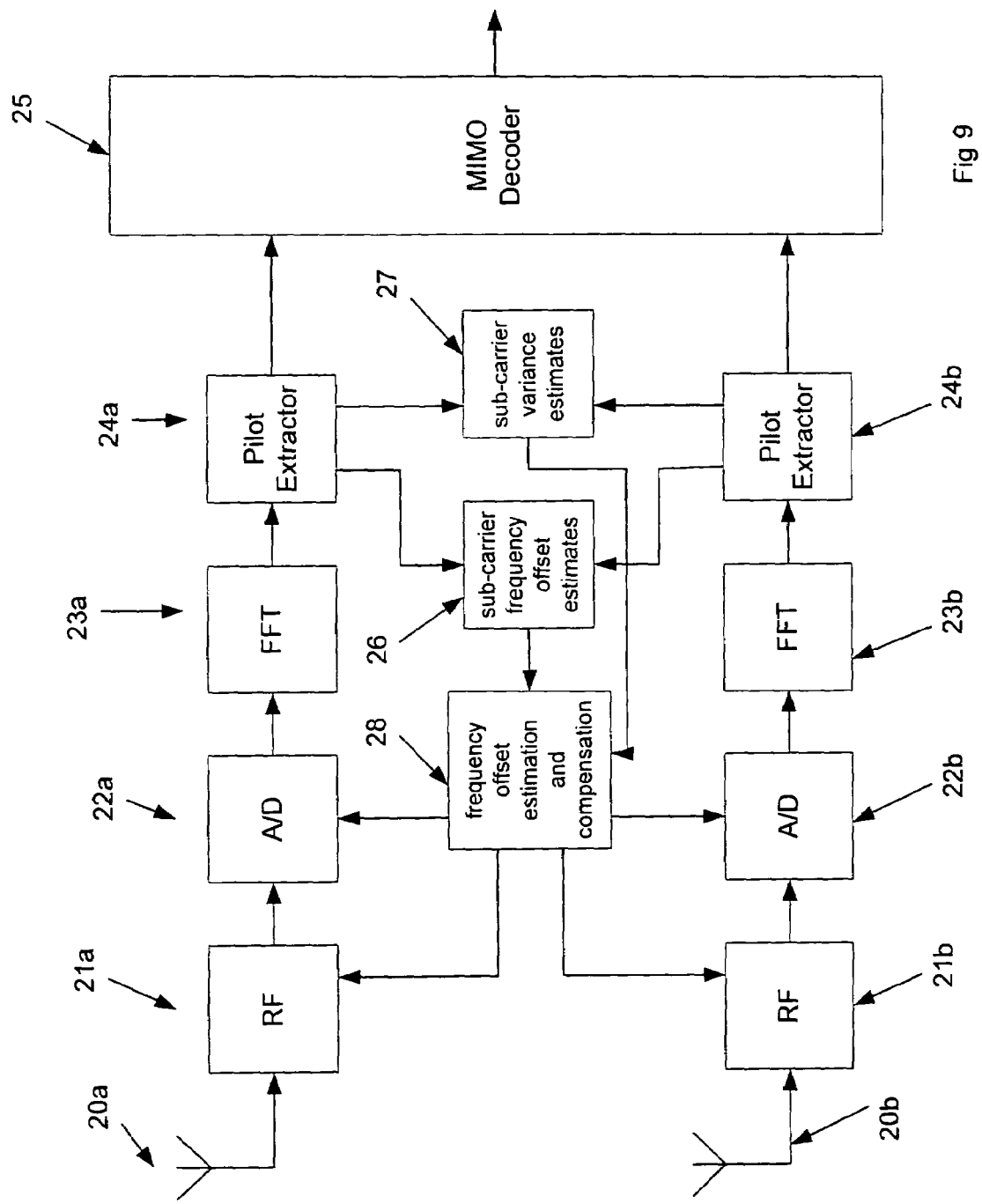
FIG. 9 illustrates an architecture of a receiver according to an embodiment.

Turning to FIG. 9, an architecture for a MIMO OFDM receiver according to an embodiment is shown. In this example a 2 antenna receiver is shown, although any number of multiple antennas could be used. Each antenna 20*a* and 20*b* is coupled to a respective RF sub-system 21*a* and 21*b* which down-converts the RF signals to baseband and attempts to keep track of the carrier frequencies using PLL's as known. The baseband output is sampled by a respective analogue to digital converter 22*a* and 22*b* to provide a digital OFDM symbol stream. As is known, a serial-to-parallel converter and matched filtering then serialisation is implemented using a fast Fourier transform function 23*a* and 23*b*. The pilot subcarriers are extracted by respective pilot extractors 24*a* and 24*b* for frequency offset tracking and other purposes which are beyond the scope of this discussion. The data sub-channels from each antenna receiving chain are then fed to a MIMO decoder 25 in order to recover the originally transmitted symbols as is known.

The method of FIG. 8 is used to estimate the frequency offset of the receiver using the extracted pilot sub-carriers.

The respective pilot sub-carriers from each receiving antenna chain which are extracted by the extractors 24a and 24b are simply combined for this application. Pilot symbols from the combined extracted pilot sub-carriers are then used to estimate the phase shift due to frequency offset at function block 26. The preferred method is to measure phase rotation between adjacent pilot symbols as described above, although the phase shift between symbols separated by one or more other pilot symbols could alternatively be used.

The error variance of the phase rotations of each composite sub-carrier signal are also measured in functional block 27 as described above. These values are then feed to a functional block 28 which implements the above described least squares line fit estimation method for receiver frequency offset. This is then used to adjust the PLL carrier frequencies in the RF blocks 21 and/or the A/D 22 sampling rates.

In a further alternative embodiment, coherent estimation can be used to determine the phase rotations for each sub-carrier. Thus instead of minimising $\|e^{j\Phi}r_1-r_2\|^2$, with coherent estimation, (ie using channel knowledge), $\|r_2-e^{j\Phi}Hx\|^2$ is minimised. This is a well known alternative, and provides a more accurate estimate, but it requires channel knowledge (ie H). This means it is more susceptible to inaccuracies in the channel estimates, or in other words requires greater accuracy for the channel estimates.

Using a similar mathematical deduction to that shown for differential estimation, it can also be shown that the variance or equivalent SNR based on coherent estimation is proportional to also proportional to $\|Hx\|^2/\sigma_v^2$ or $\|Hx\|^2$, and thus can similarly be used to weight the sub-carrier phase rotation estimates. More specifically, for coherent estimation it can be shown that $SNR_{eq}=2\|Hx\|^2/\sigma_v^2$.

Once the phase rotation estimates and their variances are obtained, then same least squares line fit equations described previously can be used to obtain a frequency offset estimate for the receiver.

Note that whilst the variance also requires channel knowledge, this is not as sensitive to inaccuracies in the channel estimates as the phase rotation estimates using coherent estimation.

It will be appreciated that other phase rotation methods could alternatively be used where the variance or accuracy in their estimations can be used to weight their values in a suitable receiver frequency offset calculation.

Also whilst the embodiments have been described with respect to an OFDM based system using dedicated pilot sub-carriers, a system using pilot symbols embedded in traffic channels could also benefit from the above described methods and apparatus. Following suitable pilot symbol extraction as would be known to those skilled in the art, the above described methods of estimating phase rotation between pilot symbols, weighting them according to their estimation accuracy or variance, and using the weighted rotation estimates from different sub-carriers to estimate the frequency offset for the receiver could be implemented.

Whilst the embodiments have been described with respect to MIMO based systems, the above methods could also be applied to SISO, MISO, and SIMO based systems. In each case the variance of the estimated phase shift for each sub-carrier is used to weight its contribution in estimating the overall frequency offset for the receiver. Although a simple SNR measurement could be made for SISO systems, an equivalent SNReq or variance determination could alternatively be used as described for the above embodiments.

These techniques will typically be implemented in software or as algorithms embedded in hardware such as ASIC's for example.

The skilled person will recognise that the above-described apparatus and methods may be embodied as processor control code, for example on a carrier medium such as a disk, CD- or DVD-ROM, programmed memory such as read only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array). Thus the code may comprise conventional programme code or microcode or, for example code for setting up or controlling an ASIC or FPGA. The code may also comprise code for dynamically configuring re-configurable apparatus such as re-programmable logic gate arrays. Similarly the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the embodiments may also be implemented using code running on a field-(re)programmable analogue array or similar device in order to configure analogue hardware.

The skilled person will also appreciate that the various embodiments and specific features described with respect to them could be freely combined with the other embodiments or their specifically described features in general accordance with the above teaching. The skilled person will also recognise that various alterations and modifications can be made to specific examples described without departing from the scope of the appended claims.

The invention claimed is:

1. A method of tracking frequency offset for a MIMO (multiple input multiple output) receiver receiving a plurality of channels on different carrier frequencies, the method comprising:
   estimating by the receiver a frequency shift between received symbols on each of a plurality of said carrier frequencies;
   determining a quality parameter for each said frequency shift estimate;
   said quality parameter being proportional to $\|H_k x_k\|^2$, wherein H is a channel matrix, x is a pilot matrix, and k is the channel index;
   calculating said frequency offset dependent on said carrier frequency shifts weighted depending on their respective quality parameters.

2. A method according to claim 1 wherein said frequency shift is determined by determining a phase rotation between two or more symbols on each said plurality of carriers.

3. A method according to claim 2 wherein the phase rotation is determined according to differential detection or coherent detection.

4. A method according to claim 1 wherein said quality parameter is dependent on the error variance of the corresponding frequency shift for that carrier.

5. A method according to claim 4 wherein the error variance is $\sigma_v^2/\|Hx\|^2$, where $\sigma^2$ is the channel noise variance.

6. A method according to claim 1 wherein the receiver is an OFDM (orthogonal frequency division multiplexing) receiver and the carrier frequencies are pilot sub-channels.

7. A method according to claim 1 wherein said calculating comprises calculating the least squares line fit of said carrier frequency shifts weighted by their respective quality parameters.

8. A method according to claim 7 wherein the frequency offset is determined according to:

$$\hat{\beta} = \frac{\sum_k SNR_k \Delta f_k}{\sum_k SNR_k}$$

where $\beta$ is the frequency offset, $SNR_k$ is the quality parameter for the frequency shift estimate for carrier k, and $\Delta f_k$ is the frequency shift estimate for carrier k.

9. A method according to claim 8 wherein said calculating is determined by allocating the frequency shift for each said carrier to the combination in the receiver of a sampling clock for an analogue to digital converter for digitising the received signal ($\alpha$) and a phase lock loop for down-converting the frequency of the received signal ($\beta$); and wherein said sampling clock and said phase lock loop frequency offsets are calculated according to the equations:

$$\hat{\alpha} = \frac{\sum_k SNR_k \sum_k SNR_k \Delta f_k k - \sum_k SNR_k \Delta f_k \sum_k SNR_k k}{\sum_k SNR_k \sum_k SNR_k k^2 - \left(\sum_k SNR_k k\right)^2}$$

$$\hat{\beta} = \frac{\sum_k SNR_k \Delta f_k - \hat{\alpha} \sum_k SNR_k k}{\sum_k SNR_k}$$

where $\alpha$ is the sampling clock estimate $\beta$ and is the phase lock loop estimate.

10. An apparatus for tracking frequency offset for a MIMO (multiple input multiple output) receiver receiving a plurality of channels on different carrier frequencies, the apparatus comprising:
means for estimating a frequency shift between received symbols on each of a plurality of said carriers;
means for determining a quality parameter for each said frequency shift estimate; the quality parameter being proportional to $\|H_k x_k\|^2$, wherein H is a channel matrix, x is a pilot matrix, and k is the channel;
means for calculating said frequency offset dependent on said carrier frequency shifts weighted depending on their respective quality parameters.

11. An apparatus according to claim 10 wherein said means for estimating a frequency shift comprises means for determining a phase rotation between two or more symbols on each said plurality of carriers.

12. An apparatus according to claim 10 wherein said quality parameter is dependent on the error variance of the corresponding frequency shift for that carrier.

13. An apparatus according to claim 12 wherein the error variance is $\sigma_v^2/\|Hx\|^2$, where $\sigma^2$ is the channel noise variance.

14. An apparatus according to claim 10 wherein the frequency offset is determined according to:

$$\hat{\beta} = \frac{\sum_k SNR_k \Delta f_k}{\sum_k SNR_k}$$

where $\beta$ is the frequency offset, $SNR_k$ is the quality parameter for the frequency shift estimate for carrier k, and $\Delta f_k$ is the frequency shift estimate for carrier k.

15. An apparatus according to claim 14 wherein said calculation is determined by allocating the frequency shift for each said carrier to the combination in the receiver of a sampling clock for an analogue to digital converter for digitising the received signal ($\alpha$) and a phase lock loop for down-converting the frequency of the received signal ($\beta$);
and wherein said sampling clock and said phase lock loop frequency offsets are calculated according to the equations:

$$\hat{\alpha} = \frac{\sum_k SNR_k \sum_k SNR_k \Delta f_k k - \sum_k SNR_k \Delta f_k \sum_k SNR_k k}{\sum_k SNR_k \sum_k SNR_k k^2 - \left(\sum_k SNR_k k\right)^2}$$

$$\hat{\beta} = \frac{\sum_k SNR_k \Delta f_k - \hat{\alpha} \sum_k SNR_k k}{\sum_k SNR_k}$$

where $\alpha$ is the sampling clock estimate $\beta$ and is the phase lock loop estimate.

16. An OFDM (orthogonal frequency division multiplexing) receiver comprising an apparatus according to claim 10.

* * * * *